United States Patent
Ramamurthy et al.

(10) Patent No.: US 9,520,980 B1
(45) Date of Patent: Dec. 13, 2016

(54) METHODS AND SYSTEMS FOR USING AIR-INTERFACE RESOURCE INFORMATION IN ROUTING PRIORITIZATION

(71) Applicant: Sprint Spectrum L.P., Overland Park, KS (US)

(72) Inventors: Suryanarayanan Ramamurthy, Olathe, KS (US); Jean-Emile Nguepi, Pingree Grove, IL (US); Jatinder Judge, Orlando, FL (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 304 days.

(21) Appl. No.: 14/300,284

(22) Filed: Jun. 10, 2014

(51) Int. Cl.
*H04L 5/00* (2006.01)
*H04W 48/18* (2009.01)

(52) U.S. Cl.
CPC ............ *H04L 5/0058* (2013.01); *H04W 48/18* (2013.01)

(58) Field of Classification Search
CPC ........... H04L 12/5689; H04L 29/08738; H04L 45/00; H04L 12/56; H04L 45/566; H04L 29/06102; H04L 29/0863; H04L 67/147; H04L 69/161
See application file for complete search history.

(56) References Cited

U.S. PATENT DOCUMENTS

| | | |
|---|---|---|
| 7,215,942 B1 | 5/2007 | McQuaide et al. |
| 2003/0125968 A1 | 7/2003 | Uppal |
| 2007/0109956 A1 | 5/2007 | Kwon et al. |
| 2007/0179974 A1 | 8/2007 | Cai et al. |
| 2011/0225281 A1 | 9/2011 | Riley et al. |
| 2011/0291882 A1 | 12/2011 | Walsh |
| 2011/0294435 A1 | 12/2011 | Miller et al. |
| 2012/0092992 A1* | 4/2012 | Pappas ................ H04L 47/2491 370/235 |
| 2013/0029710 A1 | 1/2013 | Nakamura |
| 2013/0107702 A1 | 5/2013 | Gupta et al. |
| 2014/0115654 A1 | 4/2014 | Rogers et al. |
| 2014/0169375 A1* | 6/2014 | Khan .................... H04L 45/308 370/392 |
| 2014/0233479 A1 | 8/2014 | Dahod et al. |
| 2015/0016299 A1* | 1/2015 | Zhang .................. H04L 43/028 370/253 |
| 2015/0036687 A1 | 2/2015 | Belling |
| 2015/0245238 A1 | 8/2015 | Zhang |

(Continued)

OTHER PUBLICATIONS

Office action for pending U.S. Appl. No. 14/200,734, dated Oct. 16, 2015.

(Continued)

*Primary Examiner* — Benjamin H Elliott, IV (57) ABSTRACT

Disclosed herein is a method carried out by a router. The method includes the router receiving a data packet originated by a wireless communication device (WCD) being served by a base station. The method also includes the router determining an air-interface resource on which the base station is serving the WCD. After receiving the data packet, the router determines a routing prioritization for the data packet based at least in part on the determined air-interface resource. The router may then route the data packet in accordance with the determined routing prioritization.

19 Claims, 5 Drawing Sheets

(56) References Cited

U.S. PATENT DOCUMENTS

2016/0112742 A1* 4/2016 Skarp .................. H04W 28/20
   725/62
2016/0112896 A1* 4/2016 Karampatsis ..... H04W 28/0252
   370/230.1

OTHER PUBLICATIONS

First Action Interview Pilot Program Pre-Interview Communication for U.S. Appl. No. 14/200,734, dated Aug. 5, 2015.
First Action Interview Pilot Program Pre-Interview Communication for U.S. Appl. No. 14/244,423, dated Aug. 21, 2015.

* cited by examiner

METHODS AND SYSTEMS FOR USING AIR-INTERFACE RESOURCE INFORMATION IN ROUTING PRIORITIZATION

BACKGROUND

Unless otherwise indicated herein, the materials described in this section are not prior art to the claims and are not admitted to be prior art by inclusion in this section.

Wireless service providers may operate access networks each arranged to provide wireless communication devices (WCDs) such as cell phones, tablet computers, tracking devices, embedded wireless modules, and other wirelessly equipped communication devices, with wireless communication service. Each such access network may include a number of base stations that radiate to define an air interface over which to provide wireless service to WCDs according to an agreed air-interface protocol, such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1×RTT and 1×EV-DO), WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a WCD within coverage of the access network may engage in air-interface communication with a base station and may thereby communicate via the base station with various remote network entities and/or with other WCDs served by the base station or by other base stations.

In accordance with an agreed air-interface protocol, the air interface provided by the access network may be comprised of various air-interface resources that are utilized by the base stations to serve WCDs. For instance, each base station may radiate to define one or more air-interface coverage areas, such as cells and cell sectors, in which WCDs can operate and engage in air-interface communication with the base station. Within each air-interface coverage area, the base station may operate on one or more carrier frequencies (or "carriers"), each defining a frequency channel for communicating with WCDs. In a typical example, the base station's one or more carriers may each take the form of a particular frequency block (e.g., a 1.25 MHz, 5 MHz, or 10 MHz block) in a profile frequency band used by the wireless service provider, such as a 800 MHz band, a 1.9 GHz band, or a 2.5 GHz band.

In practice, each of the base station's one or more frequency channels may be divided into a downlink (or forward link) for carrying communications from the base station to WCDs and an uplink (or reverse link) for carrying communications from WCDs to the base stations. For example, according to some air-interface protocols, each frequency channel may be divided over frequency into a first block of frequency for downlink communications and a second block of frequency for uplink communications. Alternatively, according to other air-interface protocols, each frequency channel may be divided over time into a first set of timeslots for carrying downlink communications and a second set of timeslots for carrying uplink communications. Other techniques for dividing a frequency channel into a downlink and uplink may exist as well.

Further, the agreed air-interface protocol may employ techniques such time-division multiplexing, frequency-division multiplexing, and/or code-division multiplexing to further divide a frequency channel's downlink and/or uplink into discrete sub-resources (e.g., LTE resource blocks, 1×EV-DO forward-link timeslots and/or reverse-link channels, etc.), which may then be used to carry control and/or bearer data between the base station and WCDs on the frequency channel.

In operation, each base station may be configured to broadcast, on each of its one or more frequency channels, (1) a list of the frequency channel(s) provided by the base station and (2) a pilot (or reference) signal that WCDs are configured to monitor in order to evaluate coverage strength (e.g., signal strength and/or signal to noise ratio). For example, in a representative LTE system, each base station may broadcast, on each of its one or more frequency channels, a system information block (SIB) message that lists the frequency channels on which the base station provides service and a reference signal that LTE-compliant WCDs are arranged to monitor in order to evaluate LTE coverage provided by the base station. As another example, in a representative CDMA system, each base station may broadcast, on each of its one or more frequency channels, a channel list message (CLM) that lists the frequency channels on which the base station provides service and a pilot signal that CDMA-compliant WCDs are arranged to monitor in order to evaluate CDMA coverage provided by the base station. Other examples are possible as well.

When a WCD first enters into coverage of an access network, the WCD may then automatically scan the air interface in an effort to find the strongest available pilot signal, and the WCD may then register with the access network over the frequency channel associated with that pilot signal. For instance, the WCD may generally scan through various frequency channels and evaluate any pilot signals on those frequency channels in order to identify the frequency channel having the strongest pilot signal. In turn, the WCD may engage in registration signaling with the access network on that frequency channel in order to register with the access network. At some later time, the access network can then assign the WCD certain resources on the frequency channel and begin exchanging bearer data with the WCD.

OVERVIEW

In access networks such as those described above, wireless service providers may also employ entities that are configured to manage and enforce service policy rules for WCDs operating in the access network, such as rules defining a routing prioritization for one or more routers configured to receive and transmit data in an access network.

In some circumstances, it may be desirable for these access networks to apply rules for a given router that are based on the particular air-interface resources that are presently being used to serve a given WCD. For example, as noted above, an access network may be serving the given WCD on one of several different frequency bands, and each of these frequency bands may provide a different capacity for serving WCDs (e.g., the 2.5 GHz band may have more capacity than the 1.9 GHz band, the 1.9 GHz band may have more capacity than the 800 MHz band, etc.). Thus, the access network may wish to apply routing prioritization rules that depend on the frequency band being used to serve the given WCD so as to queue data to maximize efficiency of the access network. Along similar lines, the access network may also wish to apply routing prioritization rules that depend on other air-interface resources being used to serve the given WCD, such as a particular frequency channel on which the access network is serving the given WCD and/or a particular resource assigned to the given WCD on that frequency channel.

According to embodiments of the disclosed methods, while serving a WCD on an air-interface resource, a base station in an access network may receive data packets from the WCD. In one implementation, upon receiving each such data packet, the base station may be configured to responsively modify the data packet to include an indication of an air-interface resource being used to serve the WCD. In another implementation, upon receiving each such data packet, the base station may be configured to make a threshold decision of whether to modify the received data packet to include an indication of an air-interface resource being used to serve the WCD and then carry out the decision. The base station may carry out this decision in various manners. As one example, the base station may decide to periodically modify the data packet to include such an indication (e.g., after a given amount of time has passed and/or a given number of data packets have been received since last modifying a data packet from the WCD to include such an indication). In another example, the base station may decide to only modify the first data packet received after the base station begins serving the WCD on a particular air-interface resource. Other examples are possible as well.

If the base station does modify the data packet to include the indication of the air-interface resource being used to serve the WCD, the base station may then transmit the modified data packet, and the modified data packet reaches a router. In turn, the router may use the indication of the air-interface resource to determine a routing prioritization for the modified data packet.

In line with the discussion above, the indication of the air-interface resource on which the access network is serving the WCD may take various forms. As one example, the indication may be an indication of the particular frequency band on which the base station is serving the WCD. As another example, the indication may be an indication of the frequency channel on which the base station is serving the WCD, such as an identifier of the channel's carrier frequency of and/or the coverage area in which the frequency channel is being provided. As yet another example, the indication may be an indication of a particular resource(s) assigned to the WCD on the frequency channel, such an identifier of a particular LTE resource block, a particular 1xEV-DO timeslot and/or reverse-link channel, etc. Other examples are possible as well. It should also be understood that the indication of the air-interface resource may be some combination of two or more indications.

Advantageously, the disclosed methods and systems may thus provide information to one or more routers concerning the particular air-interface resource(s) being used by the access network to serve a given WCD, which the routers may then use to employ routing prioritization rules.

One example embodiment of the disclosed methods may include (a) a router receiving a data packet originated by a WCD being served by a base station, (b) determining an air-interface resource on which the base station is serving the WCD, (c) after receiving the data packet, the router determining a routing prioritization for the data packet based at least in part on the determined air-interface resource, and (d) the router routing the data packet in accordance with the determined routing prioritization.

Another example embodiment of the disclosed methods may include (a) a base station serving a WCD on a given air-interface resource, (b) while serving the WCD, the base station receiving a data packet from the WCD, (c) after receiving the data packet, the base station modifying the data packet to include an indication of the air-interface resource, (d) the base station transmitting the modified data packet for receipt by a router, (e) after receiving the modified data packet, the router determining a routing prioritization for the modified data packet based at least in part on the indication of the given air-interface resource, and (f) the router routing the data packet in accordance with the determined routing prioritization.

The feature of the base station modifying the data packet to include an indication of the given air-interface resource may take various forms. In one example, this feature may comprise adding the indication of the given air-interface resource to a header of the data packet, such as a general packet radio service tunneling protocol (GTP-U) extension header as an example.

The example embodiments of the disclosed methods may also include other features. For example, the example embodiments may additionally include the data packet including a quality of service class indicator (QCI) or differentiated services code point (DSCP). In such an example, the routing prioritization may then be based at least in part by both the indication of the given air-interface resource and the QCI or DSCP.

Also disclosed herein are structures configured to facilitate implementation of the disclosed methods. One embodiment of the disclosed structures may take the form of a router that includes (a) a network communication interface configured to receive and transmit data in an access network, (b) a processing unit, (c) data storage, and (d) program instructions stored in the data storage and executable by the processing unit to carry out functions such as those disclosed herein. Another embodiment of the disclosed structures may take the form of a non-transitory computer readable medium having instructions stored thereon that are executable by a processing unit to carry out functions such as those disclosed herein.

These and other aspects and advantages will become apparent to those of ordinary skill in the art by reading the following detailed description, with reference where appropriate to the accompanying drawings. Further, it should be understood that this overview and other description throughout this document is provided merely for purposes of example and is not intended to limit the scope of the invention as claimed.

DETAILED DESCRIPTION

The present method and corresponding system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
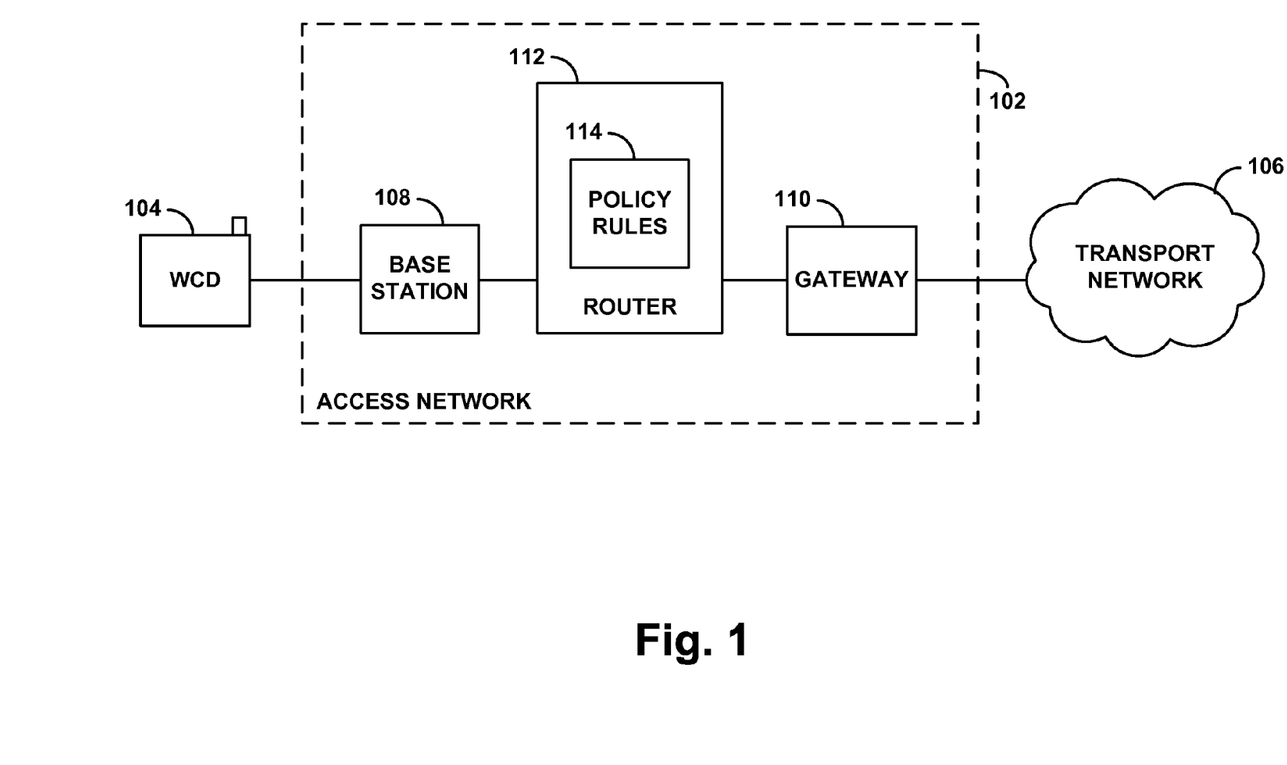
FIG. 1 is a simplified block diagram of an example network arrangement in which embodiments of the disclosed methods and entities can be implemented.

Referring to the drawings, FIG. 1 is a simplified block diagram of an example network arrangement in which embodiments of the disclosed methods and entities can be implemented. As shown, the arrangement includes an access network 102 that functions to provide wireless communication devices (WCDs) with connectivity to one or more transport networks. In particular, the access network 102 is shown providing a representative WCD 104 with connectivity to a representative transport network 106. To facilitate providing this connectivity, the access network 102 may include one or more components that communicate with the WCD 104 and with the transport network 106 and that bridge those entities together to allow the WCD 104 to engage in communications with entities on the transport network 106.

The access network 102 may be structured to provide various types of connectivity, such as wireless, circuit-switched, and/or packet-switched, for various types of communications, such as voice and/or data for instance. As a specific example, the access network 102 may be cellular wireless network that includes (1) a wireless base station 108 arranged to serve the WCD 104 in accordance with an air-interface protocol such as OFDMA (e.g., LTE or WiMAX), CDMA, WIFI, or the like, and (2) a gateway 110 that connects with a transport network such as the PSTN or the Internet. Representative WCD 104 may then be a device such as a cell phone, wirelessly-equipped computer, embedded wireless module, or the like, configured to be served wirelessly by such a base station and to engage in voice and/or data communication via the base station and the switch or gateway with entities on the PSTN or Internet. Other examples are possible as well.

The base station 108 may radiate to define one or more air-interface coverage areas, such as cells and cell sectors, in which the WCD 104 can operate and engage in air-interface communication with the base station 108. Within each air-interface coverage area, the base station 108 may operate on one or more carrier frequencies (or "carriers"). In a typical example, the base station's 108 one or more carriers may each take the form of a particular frequency block (e.g., a 1.25 MHz, 5 MHz, or 10 MHz block) in a profile frequency band used by the wireless service provider, such as a 800 MHz band, a 1.9 GHz band, or a 2.5 GHz band. Each carrier in each coverage area may then define a separate frequency channel over which the base station 108 may communicate with WCDs. As such, the base station's one or more frequency channels may be identified based on it carrier frequency and an identifier of the coverage area in which the frequency channel is provided (e.g., a PN offset, sector ID, etc.). It should be understood, however, that a frequency channel may be identified in other manners as well.

The one or more frequency channels of the base station 108 may take various forms. In one example, each of the base station's one or more frequency channels may be divided into a downlink (or forward link) for carrying communications from the base station 108 to the WCD 104 and an uplink (or reverse link) for carrying communications from the WCD 104 to the base station 108. For example, according to some air-interface protocols, each frequency channel may be divided over frequency into a first block of frequency for downlink communications and a second block of frequency for uplink communications. Alternatively, according to other air-interface protocols, each frequency channel may be divided over time into a first set of timeslots for carrying downlink communications and a second set of timeslots for carrying uplink communications. Other techniques for dividing a frequency channel into a downlink and uplink may exist as well.

Further, the agreed air-interface protocol may employ techniques such time-division multiplexing, frequency-division multiplexing, and/or code-division multiplexing to further divide a frequency channel's downlink and/or uplink into discrete sub-resources (e.g., LTE resource blocks, 1×EV-DO forward-link timeslots and/or reverse-link channels, etc.), which may then be used to carry control and/or bearer data between the base station 108 and the WCD 104 on the frequency channel.

The gateway 110 may generally function to provide connectivity between the access network 102 and the transport network 106. As such, the gateway 110 may take any form that enables it to carry out this function.

Further, a router 112 may be configured to receive data packets originated from the WCD 104, and transmit those data packets to other entities. The router 112 may be positioned in various locations. In one example, the router 112 may be positioned outside of the access network 102, such as in the transport network 106, or positioned between the transport network 106 and another entity. In another example, as shown in FIG. 1, the router 112 may be positioned inside of the access network 102 between the base station 108 and the gateway 110. As such, the router 112 may be configured to transmit and receive data packets in the access network 102. The router 112 may take various forms. In one example, the router 112 may be a separate entity as shown in FIG. 1. In another example, the router 112 may be incorporated into another entity of the access network 102, such as the gateway 110 as an example. The router may take other forms as well.

In line with the discussion above, the access network 102 may also be arranged to serve the WCD 104 with telecommunication service (e.g., connectivity to communicate on transport network 106) in accordance with a particular set of policy rules, such as rules defining a routing prioritization for the router 112. To facilitate this, the router 112 may be programmed with, have access to, or otherwise maintain a record of the routing prioritization rules and may apply those rules as the access network 102 serves the WCD 104. For instance, as shown in FIG. 1, the router may include policy rules 114 that maintain various routing prioritization rules. As the access network 102 serves the WCD 104, the router 112 may be configured to apply a given routing prioritization to data packets originating from the WCD 104.

In operation, the base station 108 serves the WCD 104 on a given air-interface resource. As discussed above, the given air-interface resource being used to serve the WCD 104 may take various forms. For instance, the base station 108 may serve the WCD 104 on a frequency channel that is defined by a carrier frequency (e.g., a particular frequency block in a particular frequency band) on which the frequency channel is employed and perhaps also a particular coverage area in which the frequency channel is provided. Additionally, the base station 108 may also serve the WCD 104 using a sub-resource on a frequency channel, such as an LTE resource block, a 1×EV-DO timeslot, a Walsh-coded channel, etc. Other examples are possible as well.

While serving the WCD 104, the base station 108 receives a data packet from the WCD 104 via the given air-interface resource. In response, the base station 108 modifies the data packet to include an indication of the given air-interface resource. The indication of the given air-interface resource may take various forms. For example, the indication of the given air-interface resource may include an indication of a particular frequency band on which the base station 108 is serving the WCD 104, an indication of at least one frequency channel on which the base station 108 is serving the WCD 104, an indication of an uplink and/or downlink on which the base station 108 is serving the WCD 104, or an indication of at least one sub-resource on which the base station 108 is serving the WCD 104. Other examples are possible as well.

The base station 108 may then send the modified data packet for receipt by the router 112. As discussed above, the router 112 is generally configured to receive data packets from one entity and transmit those data packets to another entity. In the particular example shown in FIG. 1, the router 112 receives data packets from the base station 108 and transmits those data packets to the gateway 110.

After receiving the modified data packet including the indication of the given air-interface resource, the router 112 subsequently determines a routing prioritization for the modified data packet based at least in part on the indication of the give air-interface resource. The routing prioritization determines an order in which the router 112 transmits received data packets. The router 112 may determine the routing prioritization for the modified data packet in various manners. According to one implementation, the router 112 may maintain policy rules 114 including routing prioritization rules that are based on different air-interface resources, such as different frequency bands, frequency ranges, frequency channels, or resource blocks. The routing prioritization rules may further define a queuing technique for data packets in the access network 102, which may be used by the router 112 to store data packets until the data packets can be processed and transmitted to the gateway 110. After the router determines the routing prioritization for the modified data packet, the router 112 routes the modified data packet in accordance with the determined routing prioritization.

Figure 2:
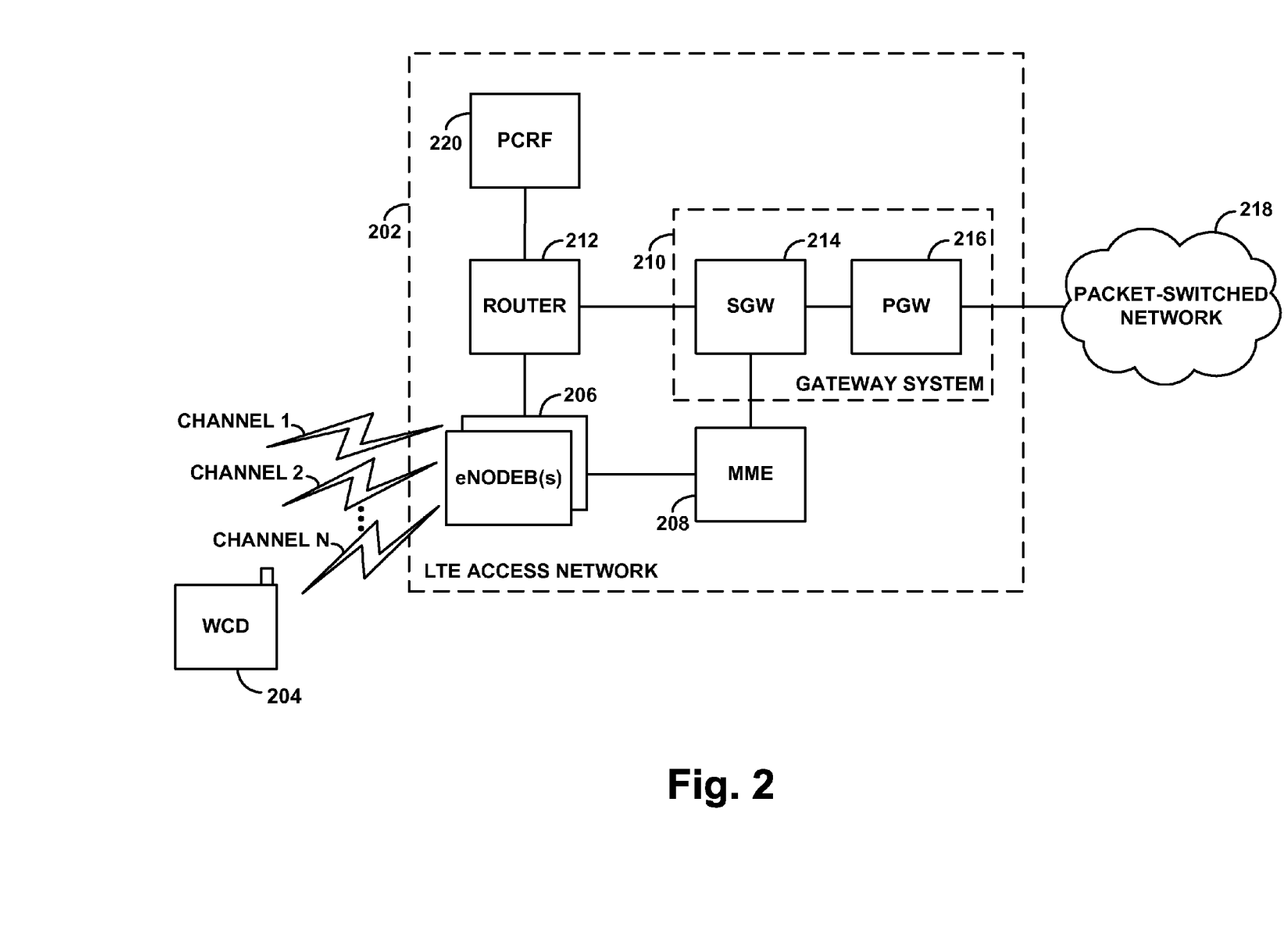
FIG. 2 is a simplified block diagram of another example network arrangement in which embodiments of the disclosed methods and entities can be implemented.

FIG. 2 is next a more specific but still simplified depiction of a network arrangement in which embodiments of the disclosed methods and entities can be implemented. In particular, the representative system includes an LTE access network 202. It should be understood that this type of access network is just an example, and that the principles described can extend to apply with respect to any other types of access networks, such as CDMA networks, or wireless access networks operating in accordance with other air-interface protocols for instance.

As noted above, the LTE access network 202 is shown with serving a WCD 204. The LTE access network 202 includes one or more representative LTE base stations 206 known as eNodeBs. Further, by way of example, the LTE access network 202 is shown defining a number of frequency channels denoted as Channels 1, 2, . . . N.

The frequency channels provided by the LTE access network 202 may take various forms. For instance, in one representative implementation of the LTE access network 202, Channels 1, 2, . . . N may each include a downlink that takes the form of a 5 MHz, 10 MHz, or 20 MHz carrier-frequency channel, which is then further divided in both the time and frequency domains into "resource blocks," each taking the form of a timeslot having a duration of 1 millisecond (ms) each divided into two 0.5 ms timeslots and spanning a set of twelve 15-kHz sub-carriers (for a total bandwidth of 180 kHz). These resource blocks may be assigned to particular WCDs such that each assigned resource block may carry control and/or bearer data intended for a particular WCD (or group of WCDs). Additionally, the resource blocks may also carry other information, such as shared control data (e.g., a reference signal for the given coverage area). Each frequency channel's uplink may then be configured in a similar manner. As noted above, in other implementations of LTE, the downlink and uplink may be distinguished from each other in the time domain rather than the frequency domain.

Each eNodeB 206 in the LTE access network 202 may be configured to broadcast, on each of its frequency channels, a specification of the one or more frequency channels provided by the base station. This specification may take various forms, and may identify the base station's one or more frequency channels in various manners (e.g., using a combination of carrier frequency and coverage-area identifier). For instance, in the LTE access network 202, each eNodeB 206 may broadcast a System Information Block #5 (SIBS) message that includes a frequency-channel list.

The LTE access network 202 further includes network infrastructure that helps enable the access network to serve WCDs. For example, the LTE access network 202 includes (1) a mobility management entity (MME) 208 that functions as a controller for the LTE access network 202, (2) a gateway system 210, and (3) a router 212 positioned between the eNodeB(s) 206 and the gateway system 212. The gateway system 212 may further include (1) a serving gateway (SGW) 214 and (2) a packet gateway (PGW) 216. The router 212 may generally function to receive data packets originating from the WCD 204 and transmit those data packets to another entity of the LTE access network 202. As such, the router 212 may take any form that enables it to carry out this function. As shown, the MME 210 has an interface for communication with each of the eNodeBs 206 and an interface for communication with the gateway system 212. With this arrangement, the MME 210 can manage registration of WCDs with the LTE access network 202, paging of WCDs served by the LTE access network 202, and setup of bearer tunnels for WCDs served by the LTE access network 202 to allow those WCDs to engage in packet data communication on packet-switched network 218.

Further, the LTE access network 202 may be a private packet-switched network operated by a cellular service provider, and the nodes shown as components of the LTE access network 202 may thus be interconnected through packet-switched connections and not necessarily as direct links as shown in FIG. 2. The router 212 may be one of numerous routers in the LTE access network 202, and, in the example scenario, one or more data packets transmitted from the WCD 204 may pass through the router 212 on the way to their destination, such as when data packets flow from the eNodeB 206 to the gateway system 210.

The LTE access network 202 may further include a policy charging and rules function (PCRF) 220 in communication with the router 212. According to this implementation, the PCRF 220 may maintain a record defining routing prioritization rules and may provide the router 212 with that routing prioritization data when the WCD attaches to or is served by the LTE access network 202. The router 212 may then store that routing prioritization data and may apply the routing prioritization rules as the LTE access network 202 serves the WCD. In another example, the router 212 may maintain routing prioritization rules locally, and may apply those rules as the router 212 receives a data packet from the eNodeB 206 as the eNodeB 206 is serving the WCD 204.

Figure 3:
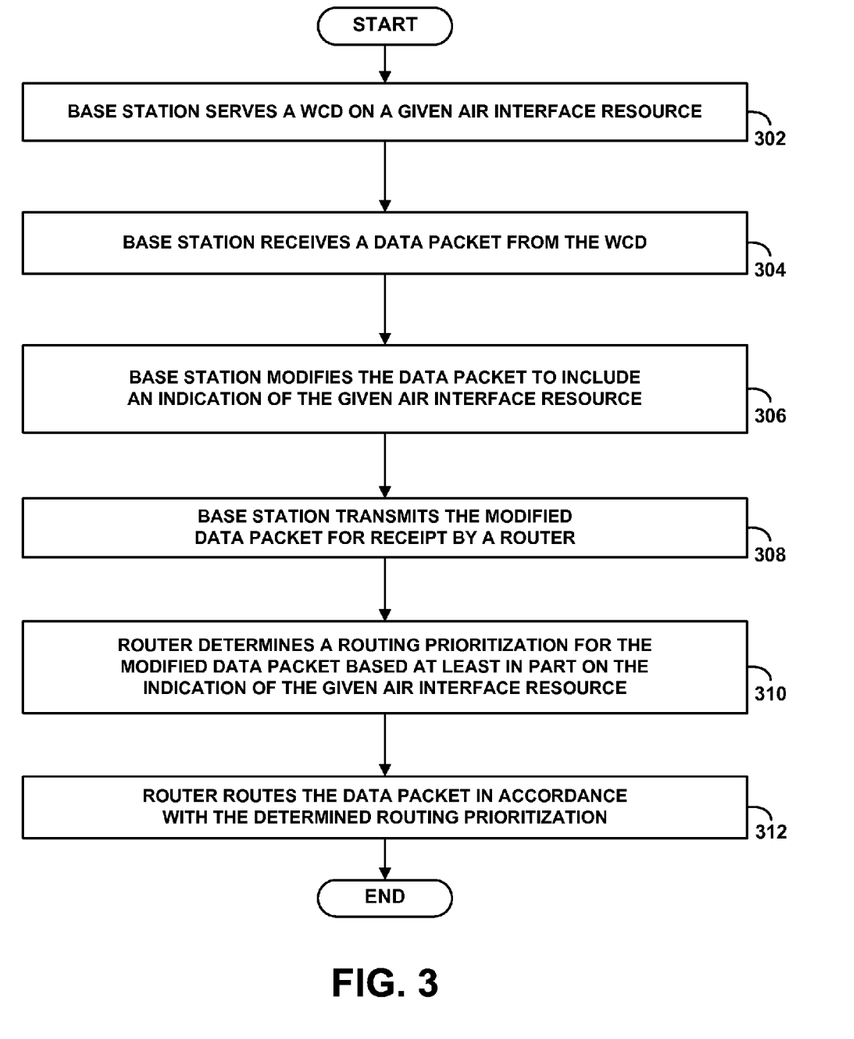
FIG. 3 is a flow chart depicting functions that can be carried out in accordance with example embodiment of the disclosed methods.

Turning now to FIG. 3, a flow chart illustrating functions that can be carried out in accordance with an example embodiment of the disclosed methods is shown. These functions may be carried out by one or more components of an access network, such as the access networks of FIG. 1 and FIG. 2 above.

As shown in FIG. 3, the example embodiment may begin at block 302 with a base station serving a WCD on a given air-interface resource. The base station can take various forms, examples of which include (1) an eNodeB of an LTE access network, as described above in relation to FIG. 2 or (2) a BTS of a CDMA access network. Further, depending on the air-interface protocol employed, the given air-interface resource being used to serve the WCD may take various forms. For instance, the base station may be serving the WCD on a frequency channel that is defined by a carrier frequency (e.g., a particular frequency block in a particular frequency band) on which the frequency channel is employed and perhaps also a particular coverage area in which the frequency channel is provided. Additionally, the base station may also be serving the WCD using a sub-resource on a frequency channel, such as an LTE resource block, a 1×EV-DO timeslot, a Walsh-coded channel, etc. Other examples are possible as well.

The method continues at block 304 with the base station receiving a data packet from the WCD. This data packet may take various forms. In one example, the data packet may include a header and a payload. The header may include information such as the IP address of the WCD, the IP address of the destination of the data packet, a quality of service class indicator (QCI), or differentiated services code point (DSCP), among other information. The payload may include the part of the transmitted data which is the fundamental purpose of the transmission. For example, the payload may include the voice data of a cellular call, the text data in a text message, or other data transmitted to or from the WCD. The data packet may take other forms as well.

Next, the method continues at block 306 with the base station modifying the data packet to include an indication of the given air-interface resource. The indication of the given air-interface resource may take various forms. In one example, the indication of the given air-interface resource may include an indication of a particular frequency band on which the base station is serving the WCD, such as one of the 800 MHz band, the 1.9 GHz band, and the 2.5 GHz band, as discussed above. In another example, the indication of the given air-interface resource may include an indication of at least one frequency channel on which the base station is serving the WCD (e.g., a carrier frequency and/or a coverage-area identifier). In yet another example, the indication of the given air-interface resource may include an indication of an uplink and/or downlink on which the base station is serving the WCD. In still another example, the indication of the given air-interface resource may include an indication of at least one sub-resource on which the base station is serving the WCD (e.g., an identifier of a resource block, timeslot, etc.). Other examples are possible as well.

Further, the feature of the base station modifying the data packet to include an indication of the given air-interface resource may take various forms. In one example, this feature may comprise adding the indication of the given air-interface resource to a header of the data packet. The header may take various forms, including a general packet radio service tunneling protocol (GTP-U) extension header, as an example. In another example, this feature may comprise adding the indication of the given air-interface resource to the payload of the data packet. Other examples are possible as well.

It should also be understood that in some embodiments, before modifying a data packet the base station receives from the WCD with air-interface resource information, the base station may be configured to make a threshold determination of whether to modify the received data packet. The base station may carry out this determination in various manners. For example, the base station may decide to include such an indication periodically (e.g., after a given amount of time has passed and/or a given number of data packets have been received since last updating a data packet from the WCD to include such an indication). In another example, the base station may decide to include such an indication only in the first data packet received after the base station begins serving the WCD on a particular air-interface resource. Other examples are possible as well.

The method continues at block 308 with the base station sending the modified data packet for receipt by a router. The modified data packet may pass through other various entities between the base station and the router. The modified data packet is transmitted by the base station and eventually received by the router. As discussed above, the router may take various forms. In one example, the router may be a separate entity in the access network, as shown in FIGS. 1 and 2. In another example, with reference to FIG. 2, in an example LTE system the router may be incorporated into another entity of the access network, such as a SGW 214 that receives the data packet from the base station (eNodeB 206) or a PGW 216 that receives the data packet from the SGW 214 and provides the WCD with connectivity to a packet-switched network 218. In yet another example, the router may be positioned outside of the access network, such as in the transport network, or positioned between the transport network and another entity. As described above, the router may generally function to receive data packets originating from the WCD and transmit those data packets to another entity. As such, the router may take any form that enables it to carry out this function.

The method continues at block 310 with the router determining a routing prioritization for the modified data packet based at least in part on the indication of the given air-interface resource. The router may make this determination in various manners.

According to one implementation, the router may maintain routing prioritization rules that are based on different air-interface resources, such as different frequency bands, frequency ranges, frequency channels, or resource blocks. In one particular implementation, the router may maintain correlation data that correlates each of various frequency bands with respective routing prioritizations. For instance, the router may maintain a first routing prioritization that correlates to the 1.9 GHz band, a second routing prioritization that correlates to the 2.5 GHz band, etc. In this respect, in one representative example, the first routing prioritization may define a higher routing priority than the second routing prioritization, such that the router may transmit data packets received from WCDs being served on the 1.9 GHz band before transmitting data packets received from WCDs being served on the 2.5 GHz band.

In such an implementation, the indication of the given air-interface resource may be compared against those different frequency bands to determine which band the given air-interface resource falls within. If the indication of the given air-interface resource provides that the WCD is being served by the base station on the 1.9 GHz band, the WCD may be configured to operate under the first routing prioritization. Similarly, if the indication of the given air-interface resource provides that the WCD is being served by the base station on the 2.5 GHz band, the WCD may be configured to operate under the second routing prioritization. Of course, many other examples of routing prioritization rules corresponding to different air-interface resources may exist as well.

The routing prioritization rules may further define a queuing technique for data packets in the access network. A queue may be used by a router to store data packets until the data packets can be processed and transmitted to other entities in the access network. The routing prioritization rules may define the order in which the router transmits queued data packets. For example, the routing prioritization rules may define that the router may transmit queued data packets received from WCDs being served on the 1.9 GHz band before transmitting queued data packets received from WCDs being served on the 2.5 GHz band. Other examples are possible as well.

In operation, the router may determine the routing prioritization rules in a variety of implementations. In one implementation, an example LTE system may include a router 212 that receives the modified data packet from the eNodeB 206. The router 212 may then transmit the updated data packet to a PCRF 222. The PCRF 222 may maintain a routing prioritization record defining routing prioritization rules based at least in part on the air-interface resource on which the WCD 204 is served by the eNodeB 206. The PCRF 222 may be configured to provide the router 212 with that routing prioritization data when the WCD attaches to or is served by the LTE access network.

In particular, in one example the router 212 may receive from the PCRF 222 routing prioritization rules, which may include different routing priorities for different air-interface resources (e.g., different frequency bands or frequency channels). The router 212 may maintain a database of such rules locally (e.g., in the data storage of the router 212) and may apply those rules as the router 212 receives the modified data packet from the eNodeB 206 including the indication of the given air-interface resource on which the eNodeB 206 is serving the WCD. In another example, the router 212 may query the PCRF 222 for a routing prioritization each time the router 212 learns of the air-interface resource on which the WCD is being served by the eNodeB 206. The PCRF 222 may then determine the appropriate routing prioritization rules to apply based at least in part on the indication of the given air-interface resource. The PCRF 222 may then provide a directive to the router 212 including the appropriate routing prioritization rules for the router 212 to implement.

Further, as discussed above, the data packet may further include an indication of a QCI and/or DSCP. In such an example, the router may determine the routing prioritization rules for the data packet based at least in part on either the indication of the given air-interface resource, the indication of the QCI and/or DSCP of the data packet, or both. Using the LTE example above, the eNodeB 206 may provide the router 212, with an indication of the QCI and/or DSCP of the data packet. The router 212 (per locally stored policy rules or per directive from the PCRF 222 in response to a query to the PCRF 222) may apply the routing prioritization rules for the data packet based on the QCI and/or DSCP of the data packet and the fact that the WCD 204 is being served on the given air-interface resource. As a specific example, the router 212 may use the indication of the QCI and/or DSCP as an initial determinant for routing prioritization. If the indication of the QCI and/or DSCP of two data packets are the same, the router 212 may then determine routing prioritization based on the given air interface used to serve the WCD. Other examples are possible as well.

The method continues at block 312 with the router routing the data packet in accordance with the determined routing prioritization. As noted above, the determined routing prioritization may define one or more routing prioritization rules used by the router in determining an order in which to transmit data packets received by the router.

Figure 4:
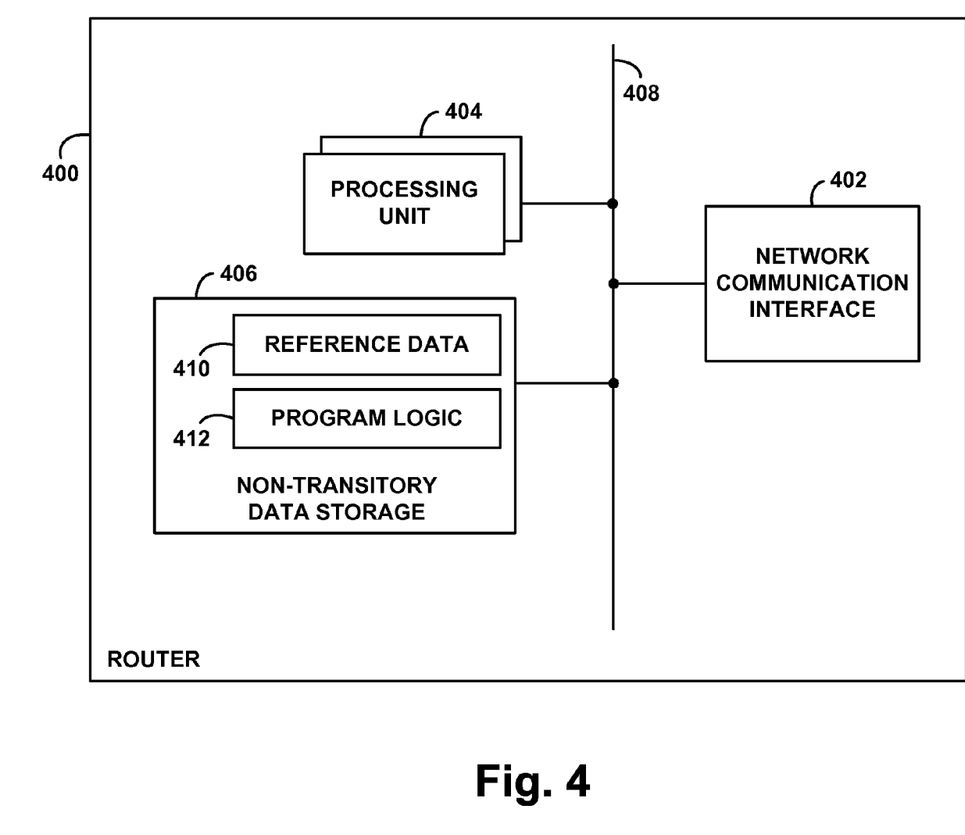
FIG. 4 is a simplified block diagram showing functional components that may be included in example router to facilitate implementation of the disclosed methods.

FIG. 4 is next a simplified block diagram depicting components of an example router 400 that may be arranged to carry out various aspects of the disclosed methods. As shown in FIG. 4, router 400 includes a network communication interface 402, a processing unit 404, and non-transitory data storage 406, all of which may be communicatively linked together by a system bus, network, or other connection mechanism 408.

In this example arrangement, network communication interface 402 functions to facilitate communication with various other entities of the system. As such, the interface may include a wired or wireless Ethernet module or other interface, depending on the manner in which communication will occur. Processing unit 404 may then comprise one or more general purpose processors (e.g., microprocessors) and/or one or more special purpose processors (e.g., application specific integrated circuits or digital signal processors). And non-transitory data storage 406 may comprise one or more volatile and/or non-volatile storage components, such as magnetic, optical, or flash storage components.

As shown, non-transitory data storage 406 may contain reference data 410 and program logic 412. Reference data 410 may comprise various data usable by processing unit 404 to carry out various functions described herein. For example, reference data 410 may comprise routing prioritization data for each of various air-interface resources and may thus define a routing prioritization based at least in part by an indication of the frequency on which the WCD is being served. Program logic 412, in turn, may then comprise machine language instructions or the like that are executable by the processing unit 404 to carry out various functions described herein, such as to receive a data packet from a base station and responsively route the data packet in a routing prioritization based at least in part by an indication of the air-interface resource on which the WCD is being served.

Figure 5:
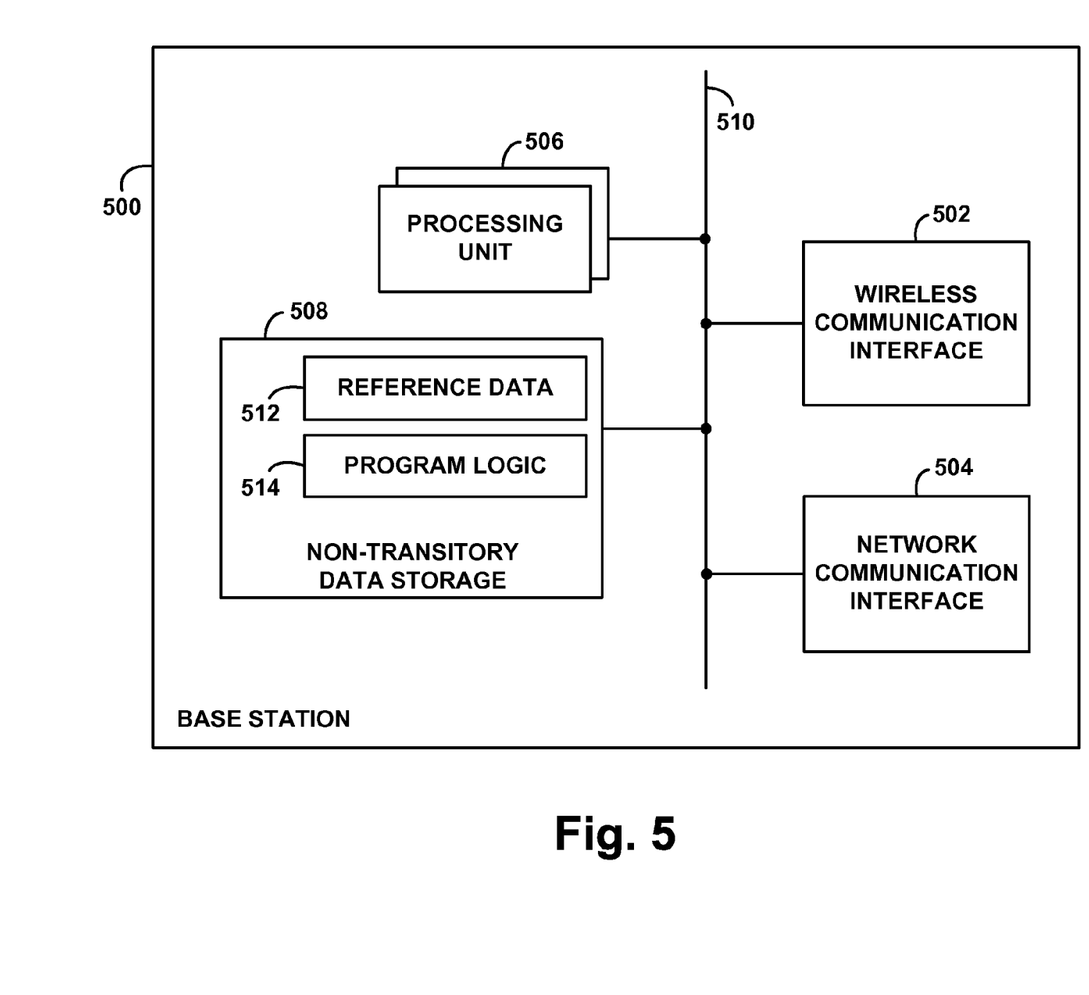
FIG. 5 is a simplified block diagram showing functional components that may be included in example base station to facilitate implementation of the disclosed methods.

FIG. 5 is a simplified block diagram depicting components of an example base station 500 that may be arranged to carry out various aspects of the disclosed methods. As shown, the example base station 500 includes a wireless communication interface 502, a network communication interface 504, a processing unit 506, and non-transitory data storage 508, all of which may be communicatively linked together by a system bus, network, or other connection mechanism 510.

In this example arrangement, wireless communication interface 502 generally functions to radiate to define one or more coverage areas in which WCDs can operate and engage in wireless communication with base station 500 over an air interface. As such, wireless communication interface 502 may include one or more antenna structures arranged in various ways (e.g., one or more directional or sectored antennas that are potentially tower mounted). Additionally, wireless communication interface 502 may include other associated components, such as a power amplifier and/or a modem for instance. Other configurations are also possible.

Network communication interface 504 generally functions to facilitate communication with one or more access networks, such as those discussed above for instance, and may thus take various forms to facilitate various types of communication such as wireless, landline, circuit-switched, and/or packet-switched communication. Network communication interface 504 may take any suitable form for carrying out this function, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 504 may also include multiple interfaces. Other configurations are possible as well.

Processing unit 506 may comprise one or more general purpose processors (e.g., microprocessors) and/or one or more special purpose processors (e.g., application specific integrated circuits or digital signal processors), programmable-logic devices (e.g., a field programmable gate array), and/or any other processor components now known or later developed. Processing unit 506 may be integrated in whole or in part with other components of base station 500.

Non-transitory data storage 508 may then comprise one or more volatile and/or non-volatile storage components, such as magnetic, optical, or flash storage components. As shown, non-transitory data storage 508 may be arranged to contain reference data 512 and program logic 514. Reference data 512 may comprise various data usable by processing unit 506 to carry out various functions described herein. Program logic 514 may then comprise machine language instructions or the like that may be executed or interpreted by processing unit 506 to carry out various functions described herein.

Exemplary embodiments have been described above. Those skilled in the art will appreciate, however, that many variations from the embodiments are possible while remaining within the spirit and scope of the claims.

What is claimed is:

1. A method comprising:
 a router receiving a data packet from a base station, wherein the data packet is originally transmitted by a wireless communication device (WCD) being served by the base station, and wherein the data packet, having been modified by the base station includes an indication of an air-interface resource on which the base station is serving the WCD;
 the router reading the indication to determine the air-interface resource on which the base station is serving the WCD;
 after receiving the data packet, the router determining a routing prioritization for the data packet based at least in part on the determined air-interface resource; and
 the router routing the data packet in accordance with the determined routing prioritization.

2. The method of claim 1, wherein the indication of the determined air-interface resource is located in a header of the data packet, and wherein determining the air-interface resource on which the base station is serving the WCD comprises reading the indication from the header of the data packet.

3. The method of claim 2, wherein the header of the data packet comprises a GTP-U extension header.

4. The method of claim 1, wherein the determined air-interface resource comprises a frequency band.

5. The method of claim 1, wherein the determined air-interface resource comprises at least one frequency channel on which the base station is serving the WCD.

6. The method of claim 1, wherein the determined air-interface resource comprises at least one Orthogonal Frequency Division Multiple Access (OFDMA) resource block on which the base station is serving the WCD.

7. The method of claim 1, further comprising:
 maintaining correlation data that correlates each of various frequency bands with respective routing prioritizations, wherein determining the routing prioritization for the data packet comprises determining that the determined air interface resource falls within a given frequency band and determining the routing prioritization based on the correlation data.

8. The method of claim 1, wherein determining the routing prioritization for the data packet comprises:
 requesting a policy charging and rules function (PCRF) to provide, based on the determined air-interface resource, an indication of the routing prioritization; and
 receiving in response from the PCRF the indication of the routing prioritization.

9. The method of claim 1, wherein the data packet further includes a quality of service class indicator (QCI) or differentiated services code point (DSCP), and wherein the router determines the routing prioritization for the data packet based at least in part on the QCI or DSCP.

10. A method comprising:
 a base station serving a wireless communication device (WCD) on a given air-interface resource;
 while serving the WCD, the base station receiving a data packet from the WCD;
 after receiving the data packet, the base station modifying the data packet to include an indication of the given air-interface resource;
 the base station transmitting the modified data packet for receipt by a router;
 after receiving the modified data packet, the router determining a routing prioritization for the modified data packet based at least in part on the indication of the given air-interface resource; and
 the router routing the data packet in accordance with the determined routing prioritization.

11. The method of claim 10, further comprising:
 determining a change in the given air-interface resource on which the base station is serving the WCD from a first air-interface resource to a second air-interface resource; and
 adjusting the routing prioritization for the modified data packet from a first routing prioritization associated with the first air-interface resource to a second routing prioritization associated with the second air-interface resource.

12. The method of claim 10, wherein the data packet further includes a quality of service class indicator (QCI) or differentiated services code point (DSCP), and wherein the router determines the routing prioritization for the modified data packet based at least in part on the QCI or DSCP.

13. The method of claim 10, wherein the given air-interface resource comprises a frequency band.

14. The method of claim 10, wherein the given air-interface resource comprises at least one frequency channel on which the base station is serving the WCD.

15. The method of claim 10, wherein modifying the data packet to include an indication of the given air-interface resource comprises adding the indication of the given air-interface resource to a header of the data packet.

16. A router comprising:
a network communication interface configured to receive and transmit data in an access network;
a processing unit; non-transitory data storage; and
program instructions stored in the non-transitory data storage and executable by the processing unit to carry out functions comprising:
receiving, via the network communication interface, a data packet from the access network, wherein the data packet is originally transmitted by a wireless communication device (WCD) being served by the access network, and wherein the data packet, having been modified by the access network, includes an indication of an air-interface resource on which the access network is serving the WCD,
reading the indication to determine the air-interface resource on which the access network is serving the WCD,
after receiving the data packet, determining a routing prioritization for the data packet based at least in part on the determined air-interface resource, and
routing, via the network communication interface, the data packet in accordance with the determined routing prioritization.

17. The router of claim 16, wherein the data packet further includes a quality of service class indicator (QCI) or differentiated services code point (DSCP), and wherein the router determines the routing prioritization for the modified data packet based at least in part on the QCI or DSCP.

18. The router of claim 16, wherein the data storage maintains correlation data that correlates each of various frequency bands with respective routing prioritizations, and wherein determining the routing prioritization for the data packet comprises determining that the determined air interface resource falls within a given frequency band and determining the routing prioritization based on the correlation data.

19. The router of claim 16, wherein determining the routing prioritization for the data packet comprises:
requesting a policy charging and rules function (PCRF) to provide, based on the determined air-interface resource, an indication of the routing prioritization; and
receiving in response from the PCRF the indication of the routing prioritization.

* * * * *